US009536209B2

(12) United States Patent
Holler et al.

(10) Patent No.: US 9,536,209 B2
(45) Date of Patent: Jan. 3, 2017

(54) TRACKING COMPLIANCE OF PERSONAL PROTECTION ARTICLES

(75) Inventors: Robert E. Holler, Cottage Grove, MN (US); Susan E. Peters, Woodbury, MN (US); Lawrence J. Ptasienski, North Oaks, MN (US); Neal A. Rakow, Woodbury, MN (US); Cristina U. Thomas, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1597 days.

(21) Appl. No.: 12/671,923

(22) PCT Filed: Jul. 23, 2008

(86) PCT No.: PCT/US2008/070799
§ 371 (c)(1),
(2), (4) Date: Feb. 3, 2010

(87) PCT Pub. No.: WO2009/032417
PCT Pub. Date: Mar. 12, 2009

(65) Prior Publication Data
US 2011/0115629 A1    May 19, 2011

Related U.S. Application Data

(60) Provisional application No. 60/999,744, filed on Aug. 31, 2007.

(51) Int. Cl.
*G08B 13/14*    (2006.01)
*G06Q 10/00*    (2012.01)

(52) U.S. Cl.
CPC ..................... *G06Q 10/00* (2013.01)

(58) Field of Classification Search
CPC ............... A61B 2503/20; A61B 2560/0242; A61B 2560/0276; A61B 5/02055; A61B 5/024; A62B 10/08
See application file for complete search history.

(56) References Cited

U.S. PATENT DOCUMENTS 4,656,463 A    4/1987    Anders et al.
5,023,597 A    6/1991    Salisbury
(Continued)

FOREIGN PATENT DOCUMENTS

DE    19816396 C1    11/1999
DE    10008048    9/2001
(Continued)

OTHER PUBLICATIONS

Capital Safety ISafe Intelligent Safety System website literature, http://www.capitalsafety.com/Default.aspx?tabid=220 [retrieved from the internet Aug. 21, 2007].
(Continued)

*Primary Examiner* — Kerri McNally
*Assistant Examiner* — Renee Dorsey

(57) ABSTRACT

Methods and systems for tracking compliance of personal protection (PP) articles in working environments. Tracking compliance includes providing at least one PP article configured with a smart tag; providing at least one predetermined criterion that governs compliance with respect to the at least one PP article in a particular working environment; tracking the PP article by retrieving smart tag data; and determining whether the smart tag data satisfies at least one predetermined criterion; and storing data relating to results of the determination.

15 Claims, 6 Drawing Sheets

(56) References Cited

U.S. PATENT DOCUMENTS

| | | |
|---|---|---|
| 5,164,707 A | 11/1992 | Rasmussen et al. |
| 5,552,772 A | 9/1996 | Janky et al. |
| 5,666,010 A | 9/1997 | Stratiotis |
| 5,796,341 A | 8/1998 | Stratiotis |
| 5,971,282 A | 10/1999 | Rollender et al. |
| 6,100,806 A | 8/2000 | Gaukel |
| 6,144,301 A | 11/2000 | Frieden |
| 6,472,988 B1 | 10/2002 | Feld et al. |
| 6,741,174 B2 | 5/2004 | Rhoades et al. |
| 6,853,303 B2 | 2/2005 | Chen et al. |
| 6,987,451 B2 | 1/2006 | McKeown |
| 6,995,665 B2 | 2/2006 | Appelt et al. |
| 6,995,673 B1 | 2/2006 | Osredkar et al. |
| 7,019,652 B2 | 3/2006 | Richardson |
| 7,044,373 B1 | 5/2006 | Garber et al. |
| 7,069,100 B2 | 6/2006 | Monette et al. |
| 7,098,793 B2 | 8/2006 | Chung |
| 7,113,094 B2 | 9/2006 | Garber et al. |
| 7,123,151 B2 | 10/2006 | Garber et al. |
| 7,158,030 B2 | 1/2007 | Chung |
| 7,464,001 B1 | 12/2008 | Adams |
| 7,652,576 B1* | 1/2010 | Crossno ............... G06Q 30/02 340/539.1 |
| 2001/0047283 A1 | 11/2001 | Melick et al. |
| 2002/0008623 A1 | 1/2002 | Garber et al. |
| 2002/0031997 A1 | 3/2002 | Lawler, Jr. et al. |
| 2004/0004547 A1 | 1/2004 | Appelt et al. |
| 2004/0088780 A1 | 5/2004 | Bachar |
| 2004/0100384 A1 | 5/2004 | Chen et al. |
| 2004/0131498 A1 | 7/2004 | Kuutti |
| 2004/0176958 A1* | 9/2004 | Salmenkaita ..... H04M 1/72561 704/275 |
| 2005/0131578 A1 | 6/2005 | Weaver |
| 2005/0148828 A1 | 7/2005 | Lindsay |
| 2005/0149387 A1 | 7/2005 | O'Shea et al. |
| 2005/0251424 A1 | 11/2005 | Sanders et al. |
| 2005/0258238 A1 | 11/2005 | Chapman |
| 2006/0006999 A1 | 1/2006 | Walczyk et al. |
| 2006/0055552 A1 | 3/2006 | Chung et al. |
| 2006/0064320 A1 | 3/2006 | Postrel |
| 2006/0074759 A1* | 4/2006 | Claudatos et al. ............. 705/22 |
| 2006/0117610 A1 | 6/2006 | Silvestri |
| 2006/0125623 A1 | 6/2006 | Appelt et al. |
| 2006/0186201 A1* | 8/2006 | Hart ............................ 235/385 |
| 2006/0268482 A1 | 11/2006 | Lin et al. |
| 2007/0001837 A1 | 1/2007 | Larson et al. |
| 2007/0010721 A1 | 1/2007 | Chen et al. |
| 2007/0013519 A1 | 1/2007 | Chung et al. |
| 2007/0199567 A1 | 8/2007 | Kanzer |
| 2008/0001753 A1* | 1/2008 | Claudatos et al. ......... 340/572.1 |
| 2008/0001763 A1* | 1/2008 | Raja et al. ................. 340/573.1 |
| 2008/0174431 A1* | 7/2008 | Rodgers ..................... 340/572.1 |
| 2009/0058600 A1 | 3/2009 | Krepel et al. |

FOREIGN PATENT DOCUMENTS

| | | |
|---|---|---|
| EP | 1516640 A1 | 3/2005 |
| EP | 1091316 B1 | 3/2006 |
| FR | 2801998 | 6/2001 |
| GB | 2422937 A | 8/2006 |
| JP | 06-299799 | 10/1994 |
| JP | 2005-078222 | 3/2005 |
| JP | 2006-072719 | 3/2006 |
| KR | 10-2006-0101405 | 9/2006 |
| KR | 10-2006-0123918 | 12/2006 |
| WO | WO 96/12524 | 5/1996 |
| WO | WO 01/06401 A1 | 1/2001 |
| WO | WO 01/43827 | 6/2001 |
| WO | WO 01/44082 A2 | 6/2001 |
| WO | WO 02/02191 | 1/2002 |
| WO | WO 02/09957 A1 | 2/2002 |
| WO | WO 2002/013150 A1 | 2/2002 |
| WO | WO 2004/008900 A1 | 1/2004 |
| WO | WO 2004/032019 A2 | 4/2004 |
| WO | WO 2004/074964 A2 | 9/2004 |
| WO | WO 2005/024579 A2 | 3/2005 |
| WO | WO 2005/045461 A1 | 5/2005 |
| WO | WO 2005/045743 A2 | 5/2005 |
| WO | WO 2005/048041 A2 | 5/2005 |
| WO | WO 2005/071978 A1 | 8/2005 |
| WO | WO 2005/109303 A2 | 11/2005 |
| WO | WO 2005/110216 A2 | 11/2005 |
| WO | WO 2005/119590 A | 12/2005 |
| WO | WO 2006/026365 A2 | 3/2006 |
| WO | WO 2008/091164 A1 | 7/2008 |

OTHER PUBLICATIONS

Durfee, Adam, et al., *White Paper on RFID, MEMS, and Their Application in the Field of Construction*, University of Kentucky, Jan. 11, 2002.

FrenchCreek Production product literature for the *Tracker* Harness Accessories.

Initiative Business Systems Respirator Management website literature, http://www.initbusy.com/rpecasestudy.html [retrieved from the internet May 17, 2007].

Swedberg, Claire, *Safety Harnesses Get Smart*, RFID Journal, Jun. 15, 2006.

Ward, Matt et al., *RFID: Frequency, Standards, Adoption and Innovation*, JISC Technology and Standards Watch, May 2006, pp. 16-20.

WhereNet product literature for *Process Control and Machine Messaging* (2003).

* cited by examiner

TRACKING COMPLIANCE OF PERSONAL PROTECTION ARTICLES

CROSS REFERENCE TO RELATED APPLICATIONS

This application is a national stage filing under 35 U.S.C. §371 of PCT/US2008/070799, filed Jul. 23, 2008, which claims priority to U.S. Application No. 60/999,744, filed Aug. 31, 2007, the disclosure of which is incorporated by reference in its/their entirety herein.

BACKGROUND

The present disclosure relates to methods and systems for tracking compliance of personal protection (PP) articles for use in working environments.

Maintaining the safety and health of workers is a major concern across many industries. Various rules and regulations have been developed to aid in addressing this concern, which provide sets of requirements to ensure proper administration of personnel health and safety procedures. To help in maintaining worker safety and health, some individuals may be required to don, wear, carry, or otherwise use PPE articles, if the individuals enter or remain in work environments that have hazardous or potentially hazardous conditions. Known types of the PPE articles include, without limitation, respiratory protection article (RPE), e.g., for normal condition use or emergency response, protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, global positioning devices, mining cap lamps and any other suitable gear.

For example, personnel in the nuclear industry may be required to wear radiation protective clothing and personal dosimeter devices. Law enforcement personnel are sometimes required to wear protective vests and helmets. There are numerous situations in the medical field in which healthcare workers must wear protective gowns, masks, face shields, gloves, etc. Workers in the food service industry are often required to wear hair netting, gloves, masks, etc. For example, there are also many industrial manufacturing scenarios in which personnel are required to wear protective or other specially designed articles in order to ensure a "clean" environment. For example, personnel in the micro-electronics manufacturing industry, biotech industry, laboratory/testing industry, are required to wear PPE articles not only to ensure their own safety, but to protect the article and devices which they assemble or perform various procedures with. There are also many industrial manufacturing scenarios in which personnel working in mines, oil refineries, metal grinding facilities, smelting facilities, industrial painting operations or pharmaceutical factories may be required to wear respiratory protection article (RPE).

There are many different kinds of RPE's utilized to prevent or reduce inhalation of hazardous or toxic materials. The RPE's remove specific air contaminants by passing ambient air through their air-purifying element. Their proper use is contingent upon the RPE's being replaced, serviced, maintained, cleaned, or otherwise processed before they fail or that they are properly used in the working environment by appropriate personnel.

Importantly, facilities in which workers wear PPE article are often required to keep detailed records regarding the PPE article as well as the individuals wearing the PPE article. Some such records may include, among other factors, information regarding use of the PPE articles, maintenance of the PPE articles, and training of the workers. In addition, records of certain mandatory regulations and compulsory audit histories must be kept for auditing purposes. For example, in some cases, RPE's require maintenance to be carried out by properly trained personnel or must be used at specific concentration levels.

Compiling records pertaining to compliance with the regulations is relatively laborious and time consuming. Currently, recordkeeping and auditing regarding the use of the PPE articles and components are being performed manually or semi-automatically by safety personnel. The making and keeping of extensive records that contain all of the above-referenced information present a substantial administrative task.

Despite the extensive records required to be kept, adherence to predetermined criteria is typically the responsibility of the wearer. Thus, compliance with the predetermined criteria may become an issue in work environments involving relatively large number of workers and/or respirators because of the relative difficulty in tracking worker habits and diligence. Clearly, when predetermined criteria are not adhered to, workers are at a higher risk of chemical exposure upon breakthrough of hazardous materials. Additionally, concentration levels of hazardous materials used in the reporting process are not necessarily static and may change over time. For example, concentration levels may spike in a particular location. Alternatively, concentration levels may become lower than originally sensed.

Because the concentration levels may subsequently change, the articles may not satisfy the predetermined criteria. For example, subsequently higher concentration levels may result in unsafe exposure conditions since compliance values are based on relatively safer concentration levels. Similarly, lower concentration levels may potentially cause more frequent and thus relatively more expensive changes in article that are actually necessary.

Thus, needs exist for methods and systems for enabling auditing and reporting on conditions, and in some cases, on-going reporting on real-time safety compliance conditions experienced by personal protection articles relative to, for example, occupational health and safety regulations, such as government regulations, insurance requirements as well as other industrial requirements. Needs also exist for methods and systems enabling periodic reporting for purposes of understanding, identifying, and remediating workplace problems. Needs also exist for methods and systems enabling compliance with applicable forms required by various reporting entities. There is also a need for methods and systems that enable being able to quickly and simply provide the records needed for reporting on compliance. There is a need for methods and systems that enable collecting data for compliance reports which reduce the cost and time it takes to meet regulations.

SUMMARY

In one exemplary embodiment, the present disclosure is directed to a method for tracking compliance with respect to at least one PP article, the method comprising: providing at least one PP article configured with a smart tag; providing at least one predetermined criterion that governs compliance with respect to the at least one PP article in a particular working environment; tracking the PP article by retrieving smart tag data; determining whether the smart tag data satisfies the at least one predetermined criterion; and storing data relating to results of the determination.

In another exemplary embodiment, the present disclosure is directed to a system for tracking compliance of personal protection articles for use in working environments. The system comprises: at least one article of personal protection article configured with a smart tag; a data processing system that includes at least one predetermined criterion that governs compliance with respect to the at least one personal protection article in a particular working environment; a data acquiring system for tracking the personal protection article by retrieving smart tag data; and a data processing system including a mechanism for determining whether the smart tag data satisfies the at least one predetermined criterion; and storing data relating to results of the determination.

DETAILED DESCRIPTION

The present disclosure substantially reduces the drawbacks and shortcomings of the known approaches for tracking compliance of PP articles by providing at least one PP article configured with a smart tag, and at least one predetermined criterion that governs compliance with respect to the at least one PP article in a particular working environment. A determination is made as to whether the smart tag data satisfies at least one predetermined criterion, and then storing data relating to results of the determination.

Figure 1:
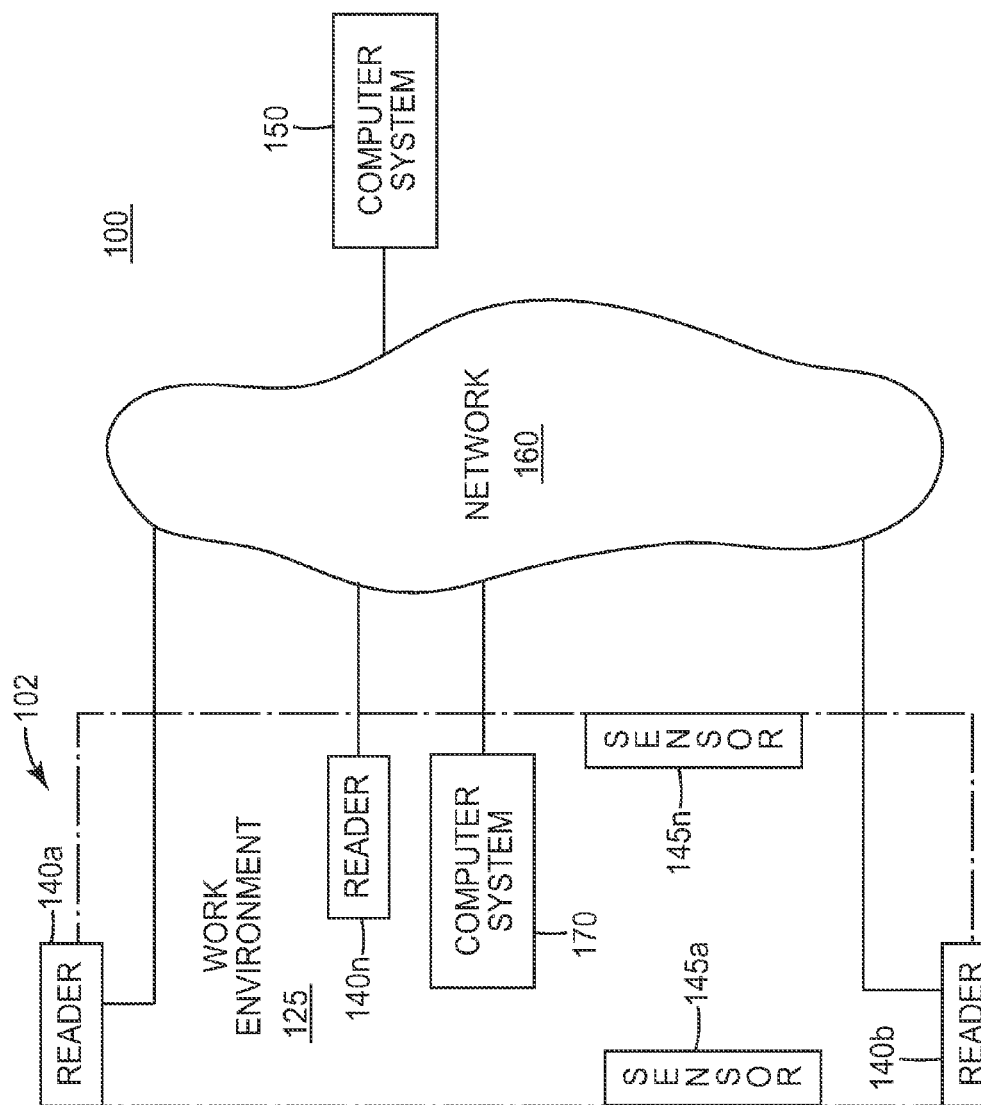
FIG. 1 is a block diagram of an exemplary PPE article condition determining system capable of implementing the process of the present disclosure.
Figure 1:
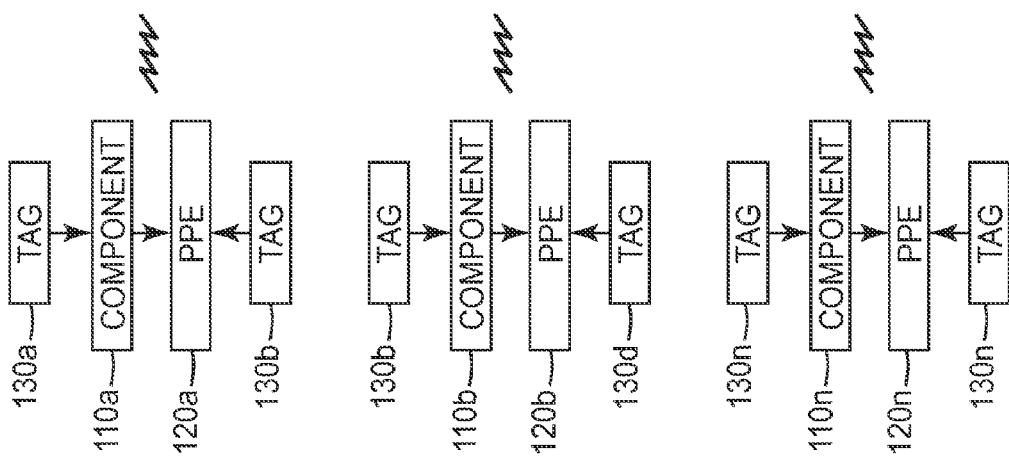

FIG. 1 illustrates a block diagram of a tracking compliance system 100 with respect to a personal protection (PP) article, such as a personal protection equipment (PPE) article, according to one exemplary embodiment of the present disclosure. The PPE article tracking compliance system 100 includes an information retrieval system 102 networked to a computer or system 150. The PPE article tracking compliance system 100 is utilized for implementing a process for determining a condition of one or more articles of personal protection equipment (PPE) 120 *a-n* (collectively, 120). The personal protection equipment articles may be coupled to a component 110*a-n* (collectively, 110) for use in combination with the personal protection equipment articles. The PPE articles 120 are to be used in one or more working environments 125 (only one is illustrated). Exemplary working environments include, without limitation, paint shops, petrochemical refineries, mines, smelting facilities, pharmaceutical factories, or the like. "Predetermined criterion or criteria" as the terms are utilized in the present application refers to a set of rules, guidelines, regulations, recommendations, certifications, or the like that governs use of the at least one PPE article in a working environment.

The rules, guidelines, regulations, recommendations, certifications, and the like may be promulgated from any source, including business and/or governmental sources. Examples of the foregoing include, without limitation, the OSHA respirator regulation that requires respirators be National Institute for Occupational Safety and Health (NIOSH) approved, and must be used in compliance with the conditions of (NIOSH) certification. If other than approved types of respirators are used, that would be in violation of appropriate rules and regulations.

For example, government regulations, such as from OSHA, provide for nine classes of filters (i.e., three levels of filter efficiency each with three categories of resistance to filter efficiency degradation). Filter efficiency is the stated percentage of particles removed from the air. Filter efficiency degradation is defined as a lowering of filter efficiency degradation or a reduction in the ability of the filter to remove particles as a result of workplace exposure. Three levels of filter efficiency are 95%, 99%, and 99.97%. The three categories of resistance to filter efficiency degradation are labeled N, R, and P. The class of filter will be clearly marked on the filter, filter package, or respirator box. For example, a filter marked N95 would mean an N-series filter that is at least 95% efficient. Chemical cartridges that include particulate filter elements will carry a similar marking that pertains only to the particulate filter element. New classes of non-powered particulate respirators require new decision logic for selection of the proper respirator. The selection process for using the new particulate classification is outlined as follows: (1) The selection of N-, R-, and P-series filters depends on the presence or absence of oil particles, as follows: If no oil particles are present in the work environment, use a filter of any series (i.e., N-, R-, or P-series). If oil particles (e.g., lubricants, cutting fluids, glycerin, etc.) are present, use an R- or P-series filter. Note that N-series filters cannot be used if oil particles are present. If oil particles are present and the filter is to be used for more than one work shift, use only a P-series filter (e.g. guide: N for Not resistant to oil, R for Resistant to oil; P for oil Proof); and (2) selection of filter efficiency (i.e., 95%, 99%, or 99.97%) depends on how much filter leakage can be accepted. Higher filter efficiency means lower filter leakage.

Other respirator rules or regulations may define that certain classes of filtering-facepieces be used with particular contaminant and/or for certain exposure times based on contaminant concentration levels. So, if sensed workplace conditions regarding particulates indicate contaminant concentration values above or below acceptable limits, such could change the exposure time accordingly. For some products, such as electrical products in the workplace, OSHA requires third-party approval, such as Underwriter Laboratories. Still other OSHA PPE rules and regulations require hard hats, safety glasses, and safety footwear meet specific certification standards. Also, companies using PPE articles typically have the responsibility for ensuring compliance with the appropriate rules, regulations, recommendations, and certifications. Facilities are sometimes allowed to determine their own predetermined criteria based on the particulars of their work environment, PPE article, and the pertinent rules and regulations that govern the former. The present disclosure is not limited to OSHA rules and regulations, but any and all other appropriate rules, regulations, recommendations and guidelines.

In an illustrated exemplary embodiment, the PPE article 120 is an article of respiratory protective equipment (RPE)

120. The RPE article 120 may be coupled to a component 110 used in conjunction with the PPE article. For example, the RPE article 120 may be a 7502 half facepiece respirator that is commercially available from 3M Company of St. Paul, Minn. The component 110 may be a 6001 Series organic vapor cartridge that is commercially available from 3M Company of St. Paul, Minn. The present disclosure is not limited by the foregoing combination of components and PPE articles, but envisions all suitable combinations. Other known types of PPE articles suitable for use in embodiments of the present disclosure include, without limitation, respiratory protection equipment (RPE) protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, global positioning devices, mining cap lamps and any other suitable gear.

In one exemplary embodiment, the information retrieval system 102 includes one or more smart tags 130a-n (collectively, 130); one or more data acquiring devices 140a-n (collectively, 140) that acquire data from the smart tags; and, one or more sensors 145a-n (collectively, 145) that, as will be described, sense for variables that are related to usage of the PPE article being tracked. Given the number of different kinds of smart tags, data acquiring devices, and sensors that can be used, there exists a large number of combinations for the system 102 that can be constructed depending on the PPE articles and the appropriate predetermined criterion. Accordingly, the exemplary information retrieval system 102 is but one of many different and suitable types.

The present disclosure contemplates use of any suitable smart tag known in the art. In one exemplary embodiment, the smart tag 130 is directly attached to the PPE article 120. Essentially, a smart tag is a data carrier that carries data accessible by suitable methods, including, but not limited to, electronic, optical, or other wireless technology. Data on a smart tag may, typically, at least, include tag identification information, such as an identification number (e.g., serial number). In addition, the smart tag 130 may contain other information relating to the article of PPE 120, such as the type of article used; historical information relating to the article, information about the user (who used it, where it was used, under what condition it was used, etc.) maintenance or other type of processing, information about who wrote information onto the smart tag; any requirements relating to the article and its associated component, and/or their use, whether any such requirements have been satisfied, such as any certifications obtained, and any other useful information, such as change-out history, or the working environment. Also, information regarding the user of the article of PPE may be on the smart tag 130; such as, medical information, information relating to fit-testing, training, job responsibilities, seniority or experience, access privileges or any other information.

Smart tags include passive and active types. Generally, passive tags do not include an internal power source and the data carried thereby is often encoded at manufacture. Data information may be acquired from a passive smart tag by, for example, radio frequency, microwave, infrared, or other wireless modes; or by optical readers or other appropriate electronic or optical technology. One type of passive smart tag is radio frequency identification (RFID) tag, wherein a transponder carries read-only data. Another type of passive smart tags may be rewritable. RFID technology is known and understood by those skilled in the art and, hence, only a brief description is included herein for facilitating understanding of the present disclosure. Passive RFID type smart tags are typically provided in the form of small labels or the like that include a coiled, etched or stamped antenna, a capacitor, and a substrate on which the components are mounted or embedded. For some metallic smart tags, the metallic portion itself may serve as the antenna. The RFID type smart tag may be embedded in or attached to the PPE articles 120 by any suitable approach. For example, the smart tags may be joinable as by being adhered, fastened, sewn, friction fitted, mechanically clipped, welded (e.g., ultrasonically) or molded, etc. onto or into the PPE articles 120.

Besides passive RFID smart tags, other passive smart tags may include, without limitation, optical kinds including barcode and optical character recognition systems; electromagnetic systems; and acoustomagnetic systems.

On the other hand, active smart tags tend to carry their own internal power source as well as data, and an appropriate antenna for allowing exchanging of their data. The internal power supply may include a micro-battery, a thin film battery, or the like. Active smart tags may be reprogrammable and include, besides an antenna, a microchip to receive and store additional information beyond the information contained in its fixed code. Active smart tags may exchange their data information with data acquiring and/or transmitting devices, such as including, without limitation, readers and/or writers, scanners, and/or data receivers, such as wireless receivers. The exchange may be initiated by the active smart tag itself once it finds a suitable or designated, reader, scanner, or receiver. The active smart tags may transmit their data in response to triggering or interrogating signals, they may actively transmit their data independent of such signals. For instance, the active smart tags may continuously or periodically transmit data to appropriate readers and/or writers, scanners, or receivers. As noted, some active smart tags include the capability to receive and store additional information beyond that contained by its encoded data. Other kinds of active smart tags may be configured to be rewritable. For instance, an active RFID smart tag may be rewritable, as by an RFID reader/writer.

Other kinds of active smart tags include a real time location system (RTLS) smart tag. An RTLS active smart tag is an active tag having a transmitter and a receiver and it communicates with a network according to a particular protocol. RTLS systems can work to determine the position of the smart tag in a 2-dimensional or 3-dimensional space. For example, a RTLS smart tag generally uses one or both of the following wireless location-based methods for determining the position of a smart tag or the object the tag is attached to.

The first is a Time Difference of Arrival (TDOA) method. In one implementation of this method, the smart tag may broadcast a signal to multiple wireless receivers 140 at known locations. The time at which the signal is received by each receiver is measured, and a set of equations can be used to determine the position of the smart tag. Examples of systems using this method are a global positioning system (GPS) or a system using low frequency radio transmitters that use the time interval between radio signals (LORAN). Another example is an active smart tag used in a WiFi system that determines how long a signal takes to reach a receiver. Companies that use this principle for RTLS systems are Aero Scout Inc., Redwood City, Calif.; Nano Tron Technologies, GmbH, Berlin, Germany; WhereNet, Santa Clara, Calif.; and, MultiSpectral Solutions, Inc., Germantown, Md.

A RTLS may also use a Received Signal Strength Indicator (RSSI) method. This latter method requires tags or fixed transceivers to measure the received power (signal strength) of the incoming signals. Then, using either known variations of signal strength vs. distance from transmitters, or by measuring the signal strengths at various locations and matching these measured strengths to the measured strengths, position can be determined. Companies that provide commercially available products using the RTLS system include Wavetrend, Fairfax Va., and PanGo Networks, Framingham, Mass.

One example of an active smart tag suitable for use in an RTLS system is an Ekahau™ smart tag, which communicates with wireless receivers in a wireless (WiFi) network through standard protocols; IEEE 802.11b and 11g. The Ekahau™ smart tag is commercially available from Ekahau, Inc., Reston Va. and may be used in the present exemplary embodiment. Other examples of suitable smart tags may be provided, and include those, such as described, in U.S. Pat. No. 6,853,303, which is incorporated herein.

As noted, the data from the smart tag may be acquired by data acquiring devices 140, such as readers 140, readers/writers 140, scanners 140, or receivers, such as wireless receivers 140, as well as other suitable devices. A reader or scanner may include an antenna for transmitting a trigger signal to a smart tag and receiving a return signal from the tag containing information. The data acquiring devices 140 may be placed in any one or more of the critical spots of the process including but not limited to the area where the PPE articles 120 are handed out to the individual. In some exemplary embodiments, one or more data acquiring devices 140, such as readers or scanners 140 are hand-held. For example, a receiver 140 may be a wireless node of a wireless local area network (WLAN) that may provide an internet access point.

The readers 140 may be linked to a remote programmable electronic system or computer 150 through the network 160. The programmable electronic system 150 includes functionalities that enable tracking usage of the PPE articles against at least a predetermined criterion. The readers may be programmable electronic systems themselves. These functionalities may include, but are not limited, to certifications regarding using, servicing, repairing, cleaning, maintaining, decontaminating, or other processing the PPE articles. For example, if the cumulative exposure time of the RPE article, in the workplace exceeds a certification value(s); the concentration level(s) of particular contaminants exceed certification value(s); the presence of unexpected contaminants in the working environment; persons with particular profiles should not be exposed to various contaminants; particular kinds of PPE articles should or should not be used when certain contaminants are present.

Figure 4:
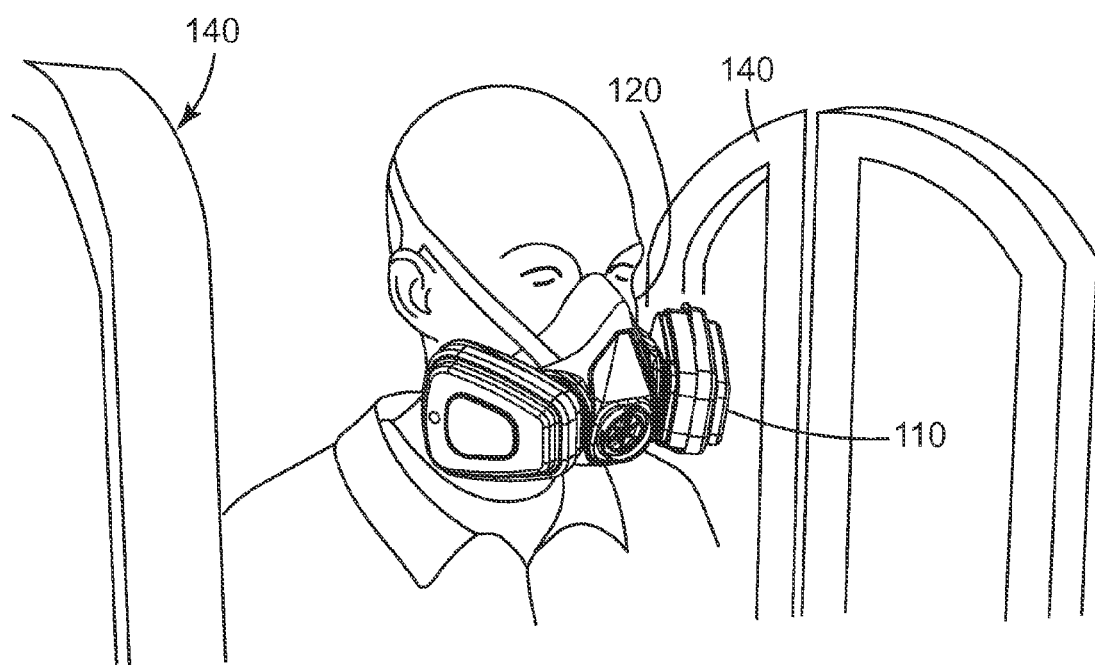
FIG. 4 is a schematic view of a wearer passing a data acquisition portal utilized in the system of FIG. 1 and wearing a smart tagged RPE article.
Figure 5:
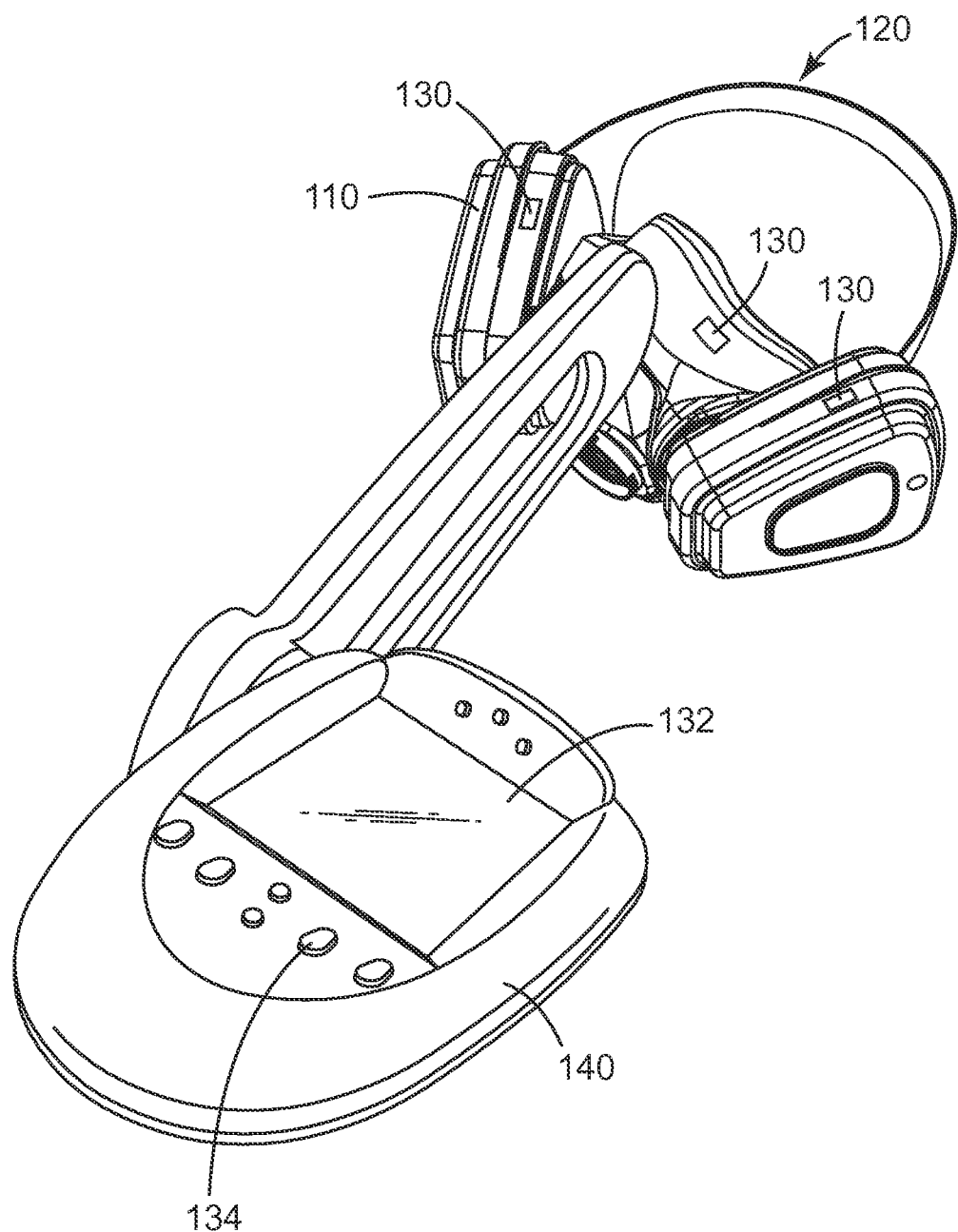
FIG. 5 is a schematic view of a smart tagged RPE including a portable reader.

As illustrated in FIGS. 1 & 4, the reader 140a may be stationed at the entrance of the work environment 125 and acquires relevant data of the wearer; component 110, and the PPE article 120, such as one or both of: at the start of the workday or shift and at the end of the work day or shift. The readers may be in a variety of one or more other locations, such as where the components are removably coupled to the PPE article. This information is sent to a database of the computer system 150 for the purposes which will be described. Alternatively or additionally, one or more readers 140 may be located within the actual work environment 125 so as to provide opportunities for wearers obtaining readings in the work environment 125. Alternatively or additionally, a portable reader 140 may be utilized (see FIG. 5), such as where the PPE articles 120 are issued prior to entering the work environment. A typical portable reader 140 may have a display 132 and keypad 134 for data input and are wirelessly connected to the network 160. The portable reader 140 may be used when the tagged PPE articles are in the work environment 125 or at the end of a work shift. The present disclosure does not place limitations on the locations or timing of reading of the tagged PPE articles.

Exemplary suitable sensors 145 of some exemplary embodiment may include, without limitation, measurement of the following analytes/parameters: electromagnetic radiation (such as thermal and visible), ionizing radiation, nuclear radiation, chemicals (such as liquids, solids, vapors, gases and mists/aerosols), biological analytes, particulates, noise, heat stress, motion, as well as others. The transducers may be of the electrical or optoelectronic type. The sensors 145 may be mobile or stationary in the work environment and connected, as for example, by wireless to the network. In the mobile mode, the sensors 145 may be disposed on the PPE or on the component. The sensed information data is generally related to the usage of the PPE article being tracked as will be explained. The data, as noted, includes, without limitation, concentration levels, types of contaminants, presence or absence of contaminants, insufficient or no current to run a circuit of the PPE article, inadequate pressure for a self-contained breathing apparatus (SCBA), insufficient or no battery power, breakthrough of a chemical through a filter, or inoperable safety mechanisms. The present disclosure is not limited by these examples since what is sensed encompasses any known factors that may relate in any way to the condition or use of the PPE articles.

Figure 3:
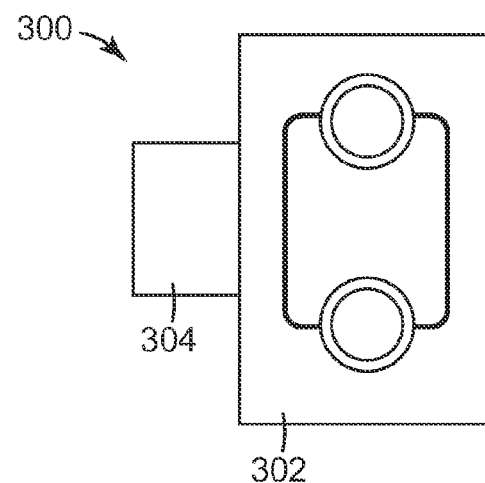
FIG. 3 is a schematic view of a smart tag coupled to a sensor.

Reference is made to FIG. 3 for illustrating a combination sensing and smart device 300 that may be attached directly to an article of PPE (not shown). The sensing and smart device 300 includes a combination of photo-ionization detector (PID) sensing device 304, and the Ekahau™ smart tag 302. The functionalities of the sensing device and the smart tag remain the same despite being physically coupled together. The combination sensing device 300 may also provide location information that may be mapped to identify a location(s) in which the concentration levels may change (e.g., spike).

The network 160 may include, without limitation, a local-area network (LAN), wide area network (WAN), the internet, or a wireless network, such as a wireless local area network (WLAN). The programmable electronic system 150 may represent any type of computer system, programmable logic devices, or the like. The computer system 150 may include server computers, client computers, PC-based servers, minicomputers, midrange computers, mainframe computers; or other suitable devices. In some exemplary embodiments, the computer system 150 may include portable computer systems including laptops, handheld computer systems. In addition, the tracking compliance system 100 may include one or more local computer systems 170 located in the work environment 125. As such, workers may be able to obtain pertinent data, for example, a real-time assessment of the condition of the PPE article while in the work environment 125. The local computer system 170 typically includes portable computer systems including laptops, handheld computer systems. The local computer system 170 may also include other computer systems, such as, client computers, PC-based servers, minicomputers, midrange computers, mainframe computers; or other suitable devices.

Figure 2:
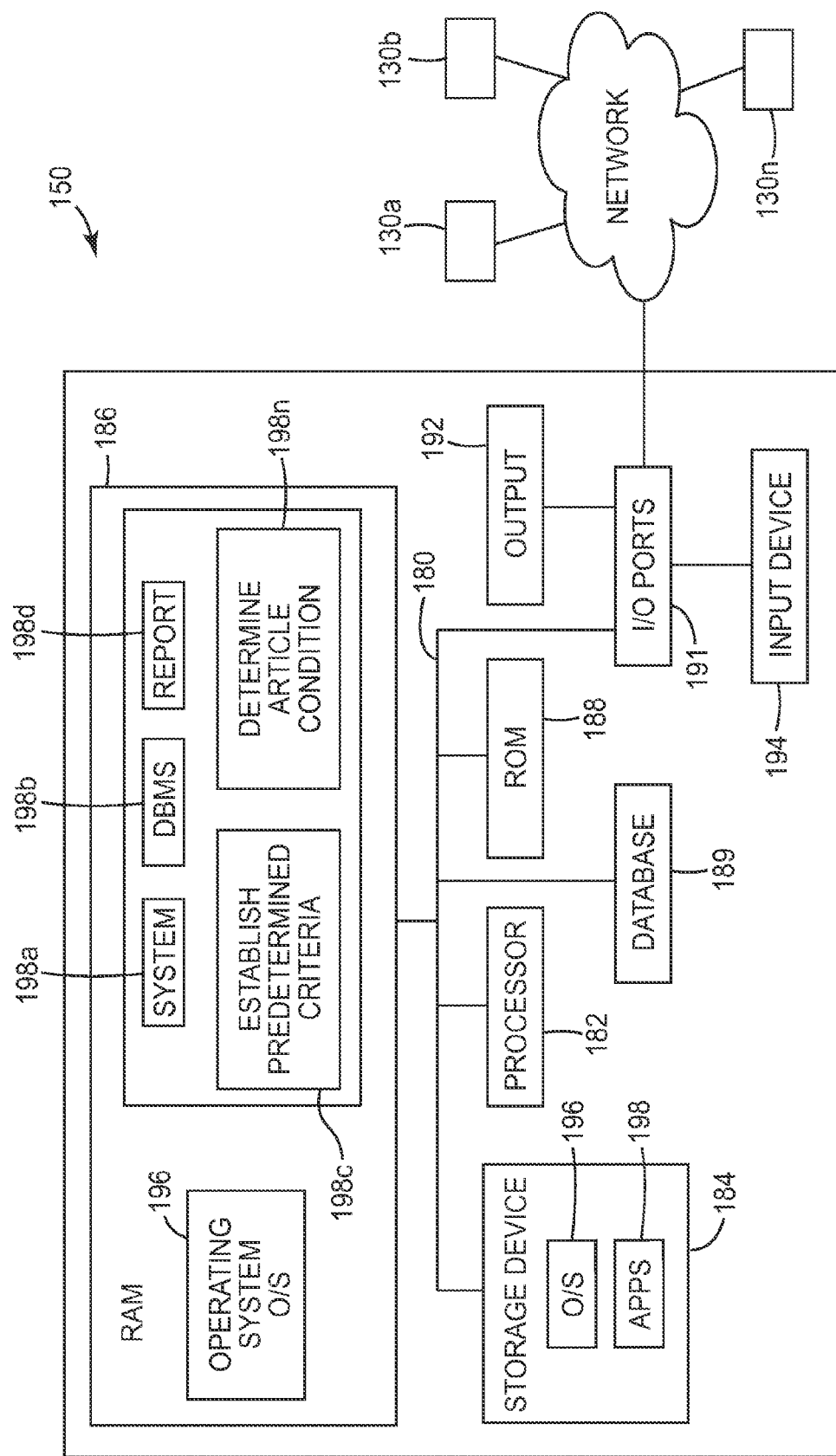
FIG. 2 is block diagram of a computer system utilizable in an information retrieval system of the present disclosure.

With continued reference to FIG. 2, there is depicted a server computer system 150. It is depicted as comprising at least one system interconnect bus 180 to which various components are coupled and communicate with each other. Coupled to the system interconnect bus 180 is at least a single processor unit 182, storage device 184, memory such as random access memory (RAM) 186, read only memory (ROM) 188, a relational database management system (DBMS) 189, and input/output (I/O) ports 191. The relational database is a computer database management system 189 controlling the storing, updating, and retrieving of data to database files for use in tracking usage of PPE articles against one or more predetermined criteria under the control of the applications to be described hereinafter. The database is for acquiring and storing all the data that is noted in the present application. The database files contain all relevant information pertaining to the operational parameters of the readers. Furthermore, one or more output devices 192 such as a display, as well as one or more user interface input devices 194, such as a keyboard and/or pointing device is respectively coupled to the I/O ports 191. In known fashion, the output and input devices 192 and 194; respectively permit wearer interaction with the computer system 150. The I/O port 191 typically includes various controllers (not shown) for each input device 194, such as a keyboard, mouse, joystick, and the like, as well as the output device 192, such as an Ethernet network adapter, infrared device and display (not shown). The processor 182 controls the input device 194 which provides a user interface for allowing a wearer to access information, such as usage history of PPE articles being tracked.

The processor unit 182 may be any suitable processor and sends and receives instructions and data to and from each of the computer system's components that are coupled to the system interconnect bus 180 to perform system operations based upon the requirements of the computer system's operating system (OS) 196, and other specialized application programs 198a-198n (collectively 198).

The ROM 188 typically controls basic hardware operations. The storage device 184 may be a permanent storage medium, such as a hard disk, CD-ROM, tape, or the like, which stores the operating system 196 and the specialized applications programs 198. The RAM 186 is volatile memory. The contents of the RAM 186 may be retrieved from the storage device 184 as required. Illustratively, the RAM 186 is shown with the operating system 196 and application programs 198 concurrently stored therein. The program code of the operating system 196 and/or application programs 198 is sent to the RAM 186 for temporary storage and subsequent execution by the processor 182. Additionally, the RAM 186 is capable of storing files from the operating system 196, as well as files from one or more application programs.

An information retrieval system application program(s) 198a is one typically utilized for controlling operations of the information retrieval system 102 including the functionalities described herein with respect to the smart tags 130, data acquiring devices 140, and sensors 145. Provision is made for a suitable database management system application 198b to run the database 189 in a manner consistent with the present disclosure. Also, provision is made for an establish predetermined criteria application 198c. This may, in some cases, be a software application provided by a manufacturer of the PPE article that are to be tracked. In some exemplary embodiments, this software application may be used to establish conditions for proper usage of the PPE article as determined by the rules and regulations established by the government, insurance company or other entity interested in the results. The establish condition determining application 198c is updatable to establish a new or current predetermined criteria related to actual conditions of the PPE article in the working environment, as for example, by using the sensed data acquired in the working environment.

A report generating application 198d is provided that may generate reports containing a variety of data in different reporting formats tailored for purposes including those described below. These reports may be generated to allow workers, supervisors, health professionals to access the history and status of articles; their medical information, information relating to fit-testing, training, job responsibilities, seniority or experience, access privileges or any other information, history of PPE article servicing, maintenance, change-out, as well as other information, such as location information including real-time location information. In the exemplary embodiment, the report generating application 198d may retrieve any suitable data including data gathered in the process 600. There is no limit as to the data that the report generating application 198d may use to prepare reports. In the exemplary embodiment, for example, the data to be retrieved and reported may include data in the database about the PPE articles, components, individuals, sensors, smart tags, equipment surrounding and used by an individual, location information, work environment information, and any other data noted in the present application. The report generating application 198d may generate one or more reports at any of one or more times in the tracking compliance process 600 or separate from the tracking compliance process 600 in response to requests by users, by entities, such as the government and companies. For example, the reports generated may include: the sensed data of the sensors, the smart tag data, the results of any determining operations according to the present disclosure, reports relating to subsequent processing of the PPE articles including communications with any individual, entity, device, or system. The reports generated my include reports based on actual conditions of the work environment, or updated data from the information retrieval system, updated predetermined criterions based on updated sensed data of the work environment. The reports generated may be related to predetermined criterions based on data from the work environment.

The determining PP condition application 198n enables performing the operations of the present disclosure including determining whether the personal protection (PP) article being tracked, by retrieving smart tag data, satisfies at least one predetermined criterion established by the establish predetermined criteria application 198c. The predetermined criterion may be related to PPE usage, location, cleaning, maintaining, decontaminating, disposal, or any other processing. Also, the application 198n may determine whether sensed data from at least one sensor in the working environment and the sensed smart tag data satisfies at least one predetermined criterion as it is related to the PP article, as well as whether to store any result(s) of its determination.

Figure 6:
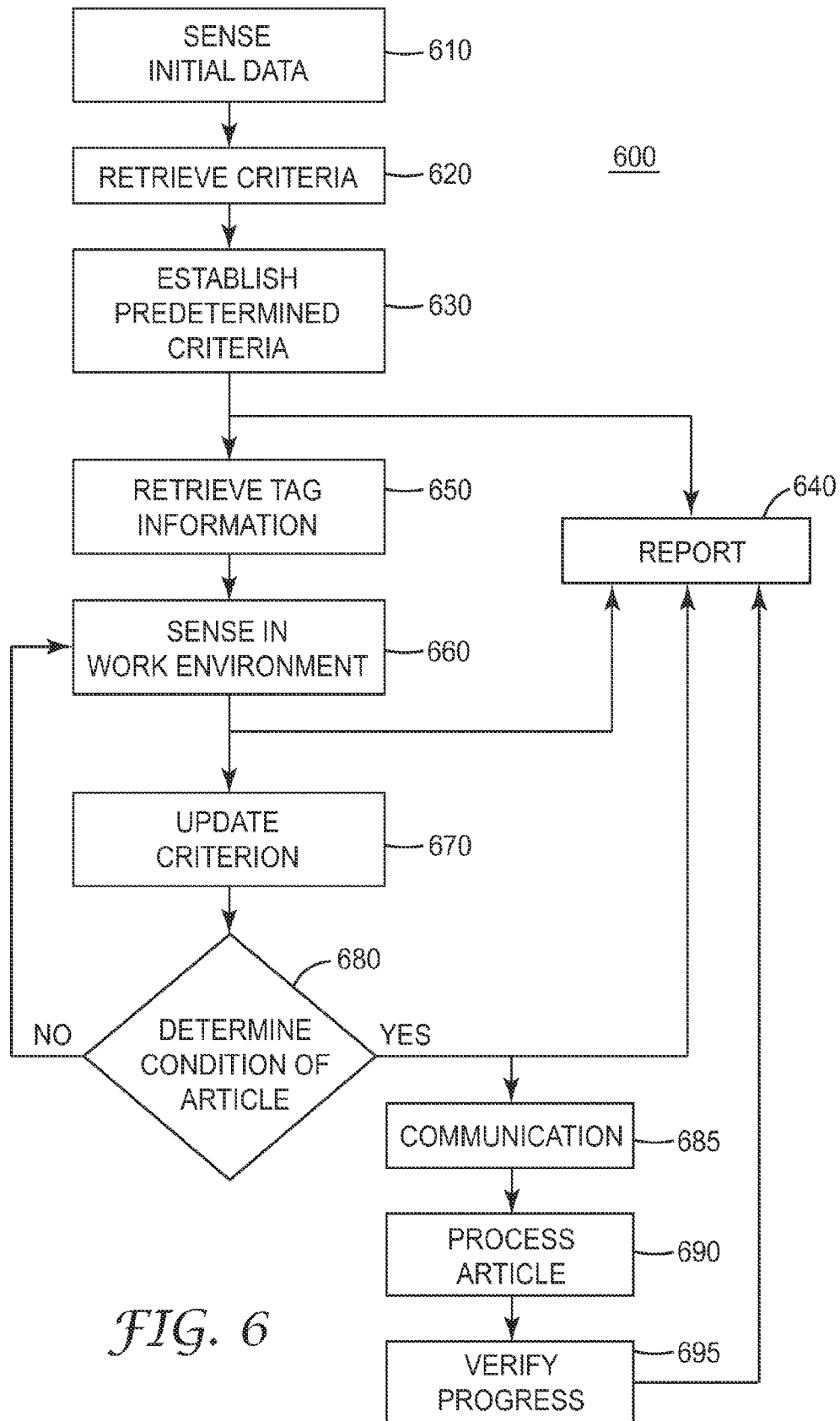
FIG. 6 is a flow diagram of one exemplary embodiment of a process that may be performed according to the present disclosure.

Reference is made to FIG. 6 for illustrating one exemplary embodiment of a PPE article tracking compliance process 600 that may be implemented by the PPE article tracking compliance system 100. The PPE article tracking compliance process 600 enables determining the condition of the PPE articles 120 tagged with a smart tag 130 after processing data received by the smart tag and/or one of the sensors. The term "condition" as utilized in the present application means the particular state of one or more factors that affect the operational life or usefulness of one or more PPE articles. In this exemplary embodiment, the condition being determined is if the RPE 120 should be serviced after exposure to contaminants for a certain exposure over time.

In a Sense Initial Condition block 610 of the PPE article tracking compliance process 600, sensing is performed by one or more of the sensors 145. In this embodiment, the type of PPE articles 120 being tracked determines which variables in the working environment should be sensed and, therefore, which sensors to be used. Since conditions of respirators are being determined in this exemplary embodiment, the sensor 145 is of the type that collects data bearing upon the PPE article's condition relative to its servicing. In particular, concentration levels of a particular hazardous material over a period of time may be sensed as by the PID sensor 145. As will be explained, the concentration levels may assist in establishing a predetermined criterion regarding the servicing condition of the tagged PPE article. The initial sensed data from the sensor 145 that is collected may reflect low, average, and peak concentration levels of the particular hazardous material(s). Other sensors may detect for the presence of other contaminants that, for example, may be incompatible with the respirator being used. While hazardous materials are being monitored in the exemplary embodiment, the present disclosure envisions that there are no limits on the variables that may be sensed and the relationship these variables have in determining the condition of the PPE article. For example, variable factors relating to other aspects of usage of the RPE article may include: charge of a battery, amps in a circuit, and circulating air pressure of their respirator. The tracking compliance process allows this data to be forwarded to the database.

The PPE article tracking compliance process 600 then proceeds to Retrieve Criteria block 620, whereat the establish a predetermined criteria application 198*c* retrieves at least one appropriate predetermined criterion (or criteria) for the PPE article whose condition is being determined. If the PPE article being monitored is a respirator, the pertinent criterion that is relevant to its condition (e.g., servicing) may be selected. The set of criteria is stored in memory. The set of criteria may be obtained from many different sources that provide guidance on the proper servicing of the PPE article as noted above. The set of criteria may be downloaded, for example, from the internet. Typically, the manufacturer of the PPE article may provide the set of criteria that is relevant to the condition of the PPE article. The set of criteria may be developed by government, industry, the company operating the system 100, an insurance company, standards' bodies, and persons of interest, such as a safety officer, industrial hygienist, or the like. In the present exemplary embodiment, the set of criteria may relate to minimum or maximum exposure times that a respirator may safely operate before being serviced. Another example of a set of criteria relates to proper battery charge of a PPE article relative to acceptable limits of performance of the PPE article. Still another example of a set of criteria that governs use of when a respirator should be serviced, repaired, or otherwise treated, is based on inadequate pressure existing, such as in a self-contained breathing apparatus (SCBA).

Following the Retrieve Criteria block 620, the tracking compliance 600 proceeds to an Establish Predetermined Criteria block 630. In the block 630, the initial data that may be sensed in the block 610 is processed in the database by the establish predetermined criterion application 198*c*. As a result, there is established a predetermined criterion for the PPE article 120 in the actual working environment. In such an exemplary embodiment, the predetermined criteria application(s) 198*c* analyzes the collected monitored data in terms of the set of criteria retrieved in the block 620 to determine the predetermined criterion that will determine if the condition of the PPE article, during its actual use in the working environment, is satisfied. For example, based on the initial concentration levels in the work environment, a maximum exposure time for the respirator is then determined before it should be serviced. The predetermined criterion takes into account the exposure time recommended or required for the respirator in the work environment.

The tracking compliance process 600 may further include a Reporting block 640 that follows the Establish Predetermined Criteria block 630 under the control of the reporting application 198*d*. The Reporting block 640 is capable for generating one or more reports relevant to a wide variety of subjects including, but not limited to, tracking compliance with respect to the PPE article regarding a determination as to whether the PPE article satisfies at least one predetermined criterion; the condition of the PPE article, the worker, or even its associated one or more components, the initial sensed data, the work environment, and other pertinent information as is set forth in the present disclosure. Typically, the Reporting block 640 generates a report in a format acceptable by an entity requesting the report, for example, the business entity using the system 100, or a governmental agency, such as OSHA. While the Report block 640 follows Establish Predetermined Criteria block 630, reports may be generated at any one or more points in the process. The reports may be generated by the workers or other persons of interest or even in response to requests by the government. The reports generated may be transmitted across the internet as well. There is no time limit to generating the reports.

The PPE article tracking compliance process 600 proceeds to a Retrieve Tag Information block 650. In this embodiment, the system 102 retrieves or acquires the data, as noted above, from the smart tags 130 by the data acquiring devices 140, such as a receiver 140, as well as the sensors 145. The smart tag 130 of this embodiment may be an Ekahau™ type 130 to provide location information as well as the data of the smart tag. Other smart tags can be provided. The receiver 140 may be located in any number of places, such as the entrance to a work environment 125. In particular, retrieving information from the smart tag 130 may provide data as to when and where the wearer enters the working environment, exits the working environment, or passes another location. Optionally, in order to identify the wearer, the latter may present his/her badge to an appropriate data acquiring device 140. The smart tag 130 or the badge may also include other data regarding the wearer, such as medical, fit test, job description, seniority, training, and other qualifications. The retrieved data is forwarded to the database 189 of the computer system 150, and, if operational, the local computer system 170. The data may include the identification of an article, date, and/or timestamp, as well as the location of the data acquiring device. The present disclosure envisions that the retrieving tag information may occur more than once and at any suitable number of points in the determining process.

The PPE article tracking compliance process 600 then proceeds to the Sense In Work Environment block 660. In the Sense In Work Environment block 660, the sensor 145, such as the PID sensor 145, is operable for providing current sensed data regarding, for example, current concentration levels of benzene vapor, in the work environment 125. This data is forwarded to the database. The PPE article tracking compliance process 600 may proceed to the Update Criterion block 670. In the Update Criterion block 670, the data from the database from the sensor 145 is acted upon by the establish predetermined criteria application 198*c*, where a new analysis is conducted to determine whether an updated predetermined criterion is to be used. Such updating enhances the overall advantages provided by the present disclosure. While the Sense In Work Environment block 660 and the Update Criterion block 670 are illustrated, they need not be present in the PPE article tracking compliance process 600. In such a case, the tracking compliance process 600 may proceed to the Determine Condition of PPE Article block 680.

In either event, the PPE article tracking compliance process 600 then may proceed to the Determine Condition of PPE Article block 680. In the Determine Condition of PPE Article block 680, the application 198n determines if the smart tag data satisfies at least one predetermined criterion as it relates to governing compliance of the PPE article to the initial or updated predetermined criterion. In particular, in an exemplary embodiment, a determination is made as to whether a respirator has an exposure time that exceeds the recommended exposure time in the working environment as determined in the Establish Predetermined Criterion block 630. If the actual exposure time does exceed the recommended exposure time then the respirator has satisfied the predetermined criterion, that the article should be serviced. In the Determine Condition of PPE Article block 680, the article has satisfied the predetermined criterion servicing (i.e., Yes) since its actual exposure time does exceed the recommended exposure time, when compared to the recommended exposure time, indicated in the Establish Predetermined Criteria block 630 or the Updated Criterion block 670. Conversely, the servicing condition is not satisfied (i.e., No) if the actual exposure time does not exceed recommended exposure time as determined in the Establish Predetermined Criteria block 630 or the Updated Criterion block 670.

The PPE article tracking compliance process 600 includes a Communicate block 685, whereat compliance or non-compliance is communicated, using any known communication methodology, to appropriate persons, or reporting entities. Such a communication may be transmitted to the user, the database, the user's supervisor, industrial hygienist or other appropriate personnel. The process of this block may be occurring at other times. In one exemplary embodiment, such communications may be made as a message to display screen of the computer or to a personal digital assistant (PDA), pager, cell phone, mobile computing device or the like. It will be appreciated other suitable software applications may be used to provide such communication. In some exemplary embodiments, such communications may include an alarm or audible signal to appropriate persons including the user and/or supervisor.

The PPE article tracking compliance process 600 also includes a Process Article block 690 that may follow the Communicate block 685. A wide variety of processes may be performed to handle the article, such as cleaning, refurbishing, disposal or the like. A wide variety of disposal methods are contemplated, for example, being displaced in a bin, this will ensure that the PPE article may not be used until some other steps are undertaken.

The PPE Article tracking compliance process 600 may then proceed to Verify Processing block 695. In the Verify Processing block 695, a data acquiring device 140 may be stationed adjacent to the processing area, such as a disposal bin, for acquiring relevant identification data from its smart tag 136 that the PPE article 120 has been processed. The verification data is transferred to the server's database for storage in the internal memory and subsequent use. As a consequence, processing is duly recorded in the database.

Figure 7:
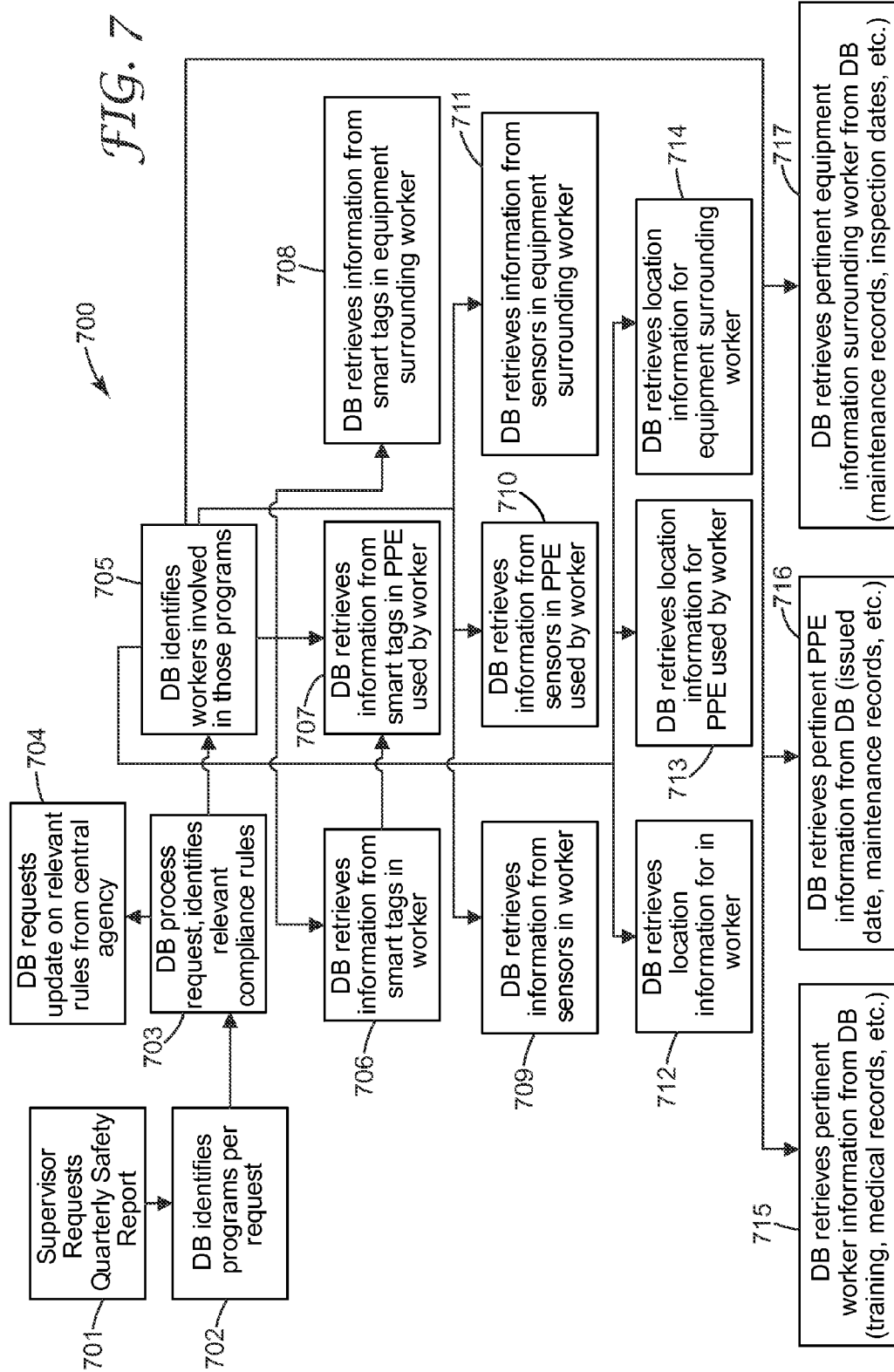
FIG. 7 is a block diagram of a reporting process according to one exemplary embodiment of the present disclosure.

FIG. 7 illustrates one exemplary embodiment of a flow diagram in regard to a report generating process 700 that may be implemented by the report generating application 198d of the present disclosure. The report generating application 198d may process the data stored in the database 189 including data acquired by the tracking compliance process 600. For example, in Supervisor Requests Quarterly Report block 701, a health professional may request for a quarterly report, as required by a governmental agency, for example OSHA, by entering such a request through any suitable user interface of the computer system 150. In an Identify Program Per Request block 702, the report generating application 198d identifies or selects the particular report generating application that may generate the report responsive to the Supervisor's request. As noted earlier, the report generating application may provide for other similar or different reports (formats, data, type of analyses, graphs, charts, etc.) concerning the data stored in the database in accordance with the reporting requirements of entities, such as companies and/or individuals (e.g., health supervisor), and in accordance to the present disclosure.

In a Process Request and Identify Relevant Compliance Rule block 703, the relevant compliance rule or predetermined criterion is selected. The selection may be based on inputted information provided by the Supervisor while identifying the quarterly report. For example, the information inputted may refer to a particular PPE article or class of PPE articles, workplace, contaminant(s), as well as user(s) including, for instance, levels of certification and training of the users. The report generating process 700 may proceed to a Request Update On Relevant Rules block 704. In the latter block, a request, such as communicated through the internet, may be made for an update of relevant rules from the government agency or other entity or individual as they may pertain to the PPE of interest.

The report generating process 700 may proceed to a Database Identifies Workers Involved In The Selected Programs block 705, whereat individuals or workers in the selected program(s) may be identified. Additionally or alternatively in this exemplary embodiment, the report generating application 198d may: 1—retrieve from the database information from smart tags on the workers in a Database Retrieves Information From Smart Tags On Worker block 706; 2—retrieve from the database information from smart tags on PPE article used by worker in a Database Retrieves Information From Smart Tags In PPE Article Used By Worker block 707; 3—retrieve from the database information from smart tags for equipment (e.g., PPE components, other PPE articles, sensors, equipment used by the worker, and all other equipment) in Database Retrieves Information From Smart Tags In Equipment Surrounding Worker block 708; 4—retrieve from the database information from sensor on the worker, as provided by, for example, one or more sensors 145 in Database Retrieves Information From Sensor For The Worker block 709; 5—retrieve from the database information from sensor in PPE article used by the worker, as provided by, for example, one or more sensors 145 in Database Retrieves Information From Sensor in PPE Article Used By The Worker 710; 6—retrieve from the database information from sensors in equipment surrounding the worker in Database Retrieves Information From Sensor In Equipment Surrounding The Worker 711; 7—retrieve from the database location information for worker, as by one of the sensors 145 in Database Retrieves Location Information For Worker 712; 8—retrieve from the database location information for PPE article used by a worker, as by one of the sensors 145, in Database Retrieves Location Information For PPE Article Used By Worker block 713; 9—retrieve from the database location information for equipment surrounding a worker, as by one of the sensors 145, in Database Retrieves Location Information For Equipment Surrounding Worker block 714; 10—retrieve from the database pertinent worker information (e.g., medical records, etc) from the database in Database Retrieves Pertinent Worker Information block 715; 11—retrieve from the database pertinent PPE article information (e.g., issue data, maintenance records, etc) from the database in Database Retrieves Pertinent PPE Article Information block 716; and, 12—retrieve from the database pertinent information for equipment surrounding the worker, as by sensors 145 or from other sources in Database Retrieves Pertinent Information for Equipment Surrounding The Worker block 717.

The report format, the data stored, retrieved, and reported, the results of any analyses, as well as any other suitable report aspect is determined by the report generating application. The present disclosure contemplates that any number of report generating applications may be included.

EXAMPLES

The following are prophetic examples using the principles of the present disclosure.

Example 1

This example relates to safety records regarding the administration of respiratory protection programs. Companies using respirators for workers are required to have a written respiratory protection programs. OSHA General Industry Standard for respiratory protection 29 CFR 1910.134 is an example of a respiratory protection program that requires that a written respiratory protection program be established by an employer. A respiratory protection program normally involves one or more administrators. In the following example, four (4) administrators are involved. Their responsibilities are outlined below. For example, they have the following responsibilities: [1] Administrator One may have complete responsibility for the program and is responsible for monitoring or conducting exposure assessments of a respiratory hazard, maintaining records, and conducting program evaluations; [2] Administrator Two may have responsibility for contaminant identification and measurement, including providing technical support, conducting air sampling, and performing laboratory analyses; [3] Administrator Three may have responsibility for the health of the company workers via a comprehensive medical and health program; [4] Administrator Four may have responsibility for selection, issuance, training, and fit testing of all respirators used in the company, including record keeping.

Administrator One at a certain period of time, as for example required, by company policies or upon government agency audits, may proceed to request a report for respiratory compliance. Administrator One may set up the request using a computer 150 that accesses a database 189 containing information generated by: smart tags 130 in respiratory protective equipment and/or components like: cartridges; elastomeric face pieces; PAPR batteries; smart tags on workers; sensors 145 in respiratory protective equipment and/or components (the sensors may measure exposure to certain respiratory hazards like benzene, toluene, or other contaminant); sensors 145 on workers, wherein sensors may measure exposure to certain respiratory hazards like benzene, toluene, or the like; sensors 145 in environment surrounding worker or equipment used by worker (e.g., these sensors may measure exposure to certain respiratory hazards like benzene, toluene, etc); real time location of respiratory equipment and/or components; as well as real time location of worker.

The tracking compliance system 100 uses the above information with information in the database 189 pertaining to: the worker (medical records, historical exposure, training, and the like); the respiratory protective equipment (end-of-service life, issued date, maintenance records, etc); the surrounding environment or equipment used (maintenance records, historical data, or other similar and pertinent information. A report(s) may then be prepared for the following areas of interest:

[1] Work Area Monitoring that may include exposure assessments that are easily provided by the foregoing described tracking compliance system 100 and can be simply updated periodically based on the information recorded by the system. The tracking compliance process and system of the present disclosure may also keep track of and notify about the desirability or performing periodic assessments. In this latter regard, Administrators One and Two may get an automated update of the work environment or area monitor reports from the tracking compliance system.

[2] Respiratory Selection may be based upon physical and chemical properties of air contaminants and their concentration levels in the work environment that may be likely to be encountered by worker(s). Such data may be acquired by one or more sensors 145 prior to actual use of the respirators. In addition, such data may be based on periodic or real time data collected by the sensors 145. In this latter regard, Administrators One, Two and Four as well as others may get automated updates of respiratory selection reports as provided by the tracking compliance system 100.

[3] Proper Respiratory Training and Fit is another area of interest which may according to the tracking and compliance system 100 may enable requests of training information, documentation regarding training; as well as provide periodic reminders of training needs and training documentation. The tracking compliance system 100 may provide fit testing information, as well as periodically remind workers of fit testing requirements, needs and documentation. The tracking compliance system 100 may provide Administrators One and Three as well as others with automated updates of the proper respiratory training and fit reports.

[4] Proper Respiratory Inspection, Maintenance and Storage is another area of interest which may, according to the tracking and compliance system 100, provide reports with information from periodically performed spot checks for usage and condition of the components. The tracking compliance system 100 may then track periodic inspection warnings that the inspection has not occurred. The database 189 of this present disclosure may contain information about manufacturer's instructions for repairs and other recommendations. During cleaning and maintenance, respirators that do not pass inspection may be removed from service and may be discarded or repaired as indicated in the Process Article block 690. Repairs may be done with parts designed for the respirator in accordance to manufacturer's instructions before reuse. The tracking compliance system 100 system may issue notices of repair, guidelines for repairs and spot repairs that are beyond the manufacturer's recommendation. The tracking compliance system 100 may capture data relevant for determining compliance to, for example, a cleaning procedure for respirators that are not discarded following a period of use (e.g., one shift). The tracking compliance system 100 may handle the identification and tracking of the storage of the equipment with the corresponding worker so as to assure that they will be worn only by the assigned worker. For example, Administrators One and Three and others may get automated updates of proper respiratory inspection, maintenance and storage reports.

[5] Program Evaluations are another area of interest which may, according to the tracking and compliance system 100, be provided periodically, for example, every 12 months. The tracking compliance system 100 may provide an automatic evaluation to ensure that a written respiratory protection program is being properly implemented and to consult with workers to ensure that they are using respirators properly. A written report may be easily produced using the tracking compliance system 100 summarizing the findings. Administrators One to Four as well as others may get an automated updates of program evaluation reports on demand or at specified intervals.

Example 2

This example relates to safety records regarding the administration of noise control and hearing conservation. Controlling occupational noise exposures to acceptable levels helps prevent work-related hearing loss. If any employee has the potential for noise exposures greater than or equal to 85 dBA (decibels, A-weighted) averaged over 8 hours, the location is required to document and implement a Hearing Conservation Program. In this example, a Hearing Conservation Program Administrator uses the tracking compliance system 100 for managing compliance to Noise Control and Hearing Conservation programs.

In database 189, the information from initial screening assessments of processes, tasks and equipment capable of producing harmful noise levels is stored. This is done for all production operators and support personnel such as maintenance, management, and engineers. The tracking compliance system 100 uses sensors 145 to measure noise exposure and documents findings in the database 189, for all process tasks. These sensors periodically perform noise monitoring of processes, equipment, and tasks that potentially expose employees to harmful noise levels. At any point that a change of equipment, material, process, or configuration of equipment is made, the tracking compliance system 100 measures and documents in the database 189 the new noise levels. Also, when sensors 145 determine exposure of 85 dBA or greater expressed as an 8-hour equivalent time weighted average (TWA), the tracking compliance system 100 will require the input of annual audiograms for all affected employees.

The system 100 will ensure that audiograms are conducted by appropriately trained personnel on calibrated equipment in compliance with applicable regulations. In addition, the tracking compliance system 100 identifies the assigned hearing protection and documents that they are capable of reducing noise exposures to 85 dBA or lower (8-hour TWA). The tracking compliance system 100 keeps track of work shifts of more than 8 hours taking into account an appropriate adjustment to the full shift TWA or the allowable exposure limit. In the case of excessive noise exposure, the tracking compliance system 100 archives information that will be easily retrieved using smart tags 130 for the allowable noise level. The existing noise levels in the work area are taken into account with sensors 145 for determining the noise level specification.

The tracking compliance system 100 serves as a record for engineering controls when they must be used as in the case of exposures are 90 dBA or greater (8-hour TWA). The tracking compliance system 100 will issue automatically administrative controls when needed so as to ensure the reduction of noise exposures to less than 85 dBA (8-hour TWA), which may include recommending to the administrator the job rotation of workers to less noisy areas, as well as recommending appropriate or higher levels of hearing protection. Also, the tracking compliance system 100 will issue an annual reminder for the required Hearing conservation training for all employees with an exposure of 85 dBA or greater (8-hour TWA).

It will be appreciated that based on the foregoing the present disclosure is not limited to the types and kinds of reports that may be generated and that the foregoing is only exemplary.

Although the methods and systems of the present disclosure have been described with referent to specific exemplary embodiments, those of ordinary skill in the art will readily appreciate that changes and modifications may be made thereto without departing from the spirit and scope of the present disclosure.

What is claimed is:

1. A computer based tracking system for determining if at least one personal protection article satisfies at least one predetermined criterion, the system comprising:
   the at least one personal protection article configured with a smart tag;
   a data processing system including at least one predetermined criterion that governs use of the at least one personal protection article;
   an information retrieval system networked to a computer or system of the tracking system, the information retrieval system including at least one smart tag scanner that acquires data from the smart tag and at least one sensor configured to sense variables related to usage of the personal protection article being tracked, wherein a type of the at least one personal protection article determines the variables for the at least one personal protection article;
   the information retrieval system is configured to retrieve smart tag data from the smart tag in the working environment to retrieve the variables;
   the data processing system configured to process the retrieved smart tag data and the variables for determining whether the smart tag data satisfies the at least one predetermined criterion; and,
   the data processing system including storage for storing data relating to results of the determination.

2. The system of claim 1, wherein the data processing system is configured to generate at least one report of the smart data or the data relating to the results of the determination.

3. The system of claim 2, further including at least one sensing device configured to sense data that is related to the at least one predetermined criterion; the information retrieval system acquires sensed data from the at least one sensing device in the working environment; and the data processing system determines whether the sensed data and the smart tag data satisfy the at least one predetermined criterion.

4. The system of claim 3, further including the data processing system for generating at least one report relating to at least one of the sensed data, the smart tag data or the data relating to results of the determination.

5. A method for tracking compliance of at least one personal protection article, the method comprising: providing at least one sensor for sensing one or more variables related to usage of the personal protection article being tracked and configuring the at least one personal protection article with a smart tag carrying data accessible by wireless technology;

configuring, by a computing device, at least one predetermined criterion that governs compliance with respect to the at least one personal protection article in a particular working environment;

tracking, by the computing device, the at least one personal protection article by retrieving the data of the smart tag from a data acquiring device by wireless communication and retrieving the one or more variables wherein a type of the at least one personal protection article determines the variables; and determining whether the smart tag data satisfies the at least one predetermined criterion based at least in part on the data of the smart tag and the one or more variables; and storing data relating to results of the determination.

6. The method of claim 5, further comprising generating at least one report relative to at least one of the smart tag data or the data relating to results of the determination.

7. The method of claim 5, further comprising:

providing at least one sensing device configured to sense data that is related to the at least one predetermined criterion;

acquiring sensed data from the at least one sensing device in the working environment; and determining whether the sensed data and the smart tag data satisfy the at least one predetermined criterion.

8. The method of claim 7, further including generating at least one report relating to at least one of the sensed data, the smart tag data or the data relating to results of the determination.

9. The method of claim 5, wherein the smart tag data includes data relating to at least one of: usage, processing, location, and condition of the at least one personal protection article.

10. The method of claim 5, further including generating at least one report on the real-time location of the smart tag in the working environment.

11. The method of claim 5, further including processing the personal protection article following a determination that the at least one predetermined criterion is not satisfied.

12. The method of claim 5, further comprising:

acquiring individual data pertaining to a user of the personal protection article; and determining whether the individual data and the smart tag data satisfy the at least one predetermined criterion.

13. The method of claim 12, further including generating at least one report relating to the individual data.

14. The method of claim 7, further comprising updating the at least one predetermined criterion based on the sensed data.

15. The method of claim 5, further comprising communicating the results of the tracking compliance to a user of the personal protection article.

\* \* \* \* \*

UNITED STATES PATENT AND TRADEMARK OFFICE
CERTIFICATE OF CORRECTION

PATENT NO. : 9,536,209 B2
APPLICATION NO. : 12/671923
DATED : January 3, 2017
INVENTOR(S) : Robert Holler et al.

Page 1 of 1

It is certified that error appears in the above-identified patent and that said Letters Patent is hereby corrected as shown below:

In the Claims

<u>Column 18</u>
Line 41 (approx.), in Claim 1, after "environment" insert -- and --.
Line 50, in Claim 2, after "smart" insert -- tag --.

Signed and Sealed this
Twenty-fourth Day of April, 2018

Andrei Iancu
*Director of the United States Patent and Trademark Office*